United States Patent
Hofman

(10) Patent No.: US 9,781,022 B2
(45) Date of Patent: Oct. 3, 2017

(54) FAULT DETECTION IN COMMUNICATION SYSTEM

(71) Applicant: Sital Technology Ltd., Kfar-Saba (IL)

(72) Inventor: Ofer Hofman, Timrat (IL)

(73) Assignee: Sital Technology Ltd., Kfar-Saba (IL)

( * ) Notice: Subject to any disclaimer, the term of this patent is extended or adjusted under 35 U.S.C. 154(b) by 0 days.

(21) Appl. No.: 14/680,189

(22) Filed: Apr. 7, 2015

(65) Prior Publication Data

US 2015/0304190 A1    Oct. 22, 2015

Related U.S. Application Data

(60) Provisional application No. 61/981,216, filed on Apr. 18, 2014.

(51) Int. Cl.
| | | |
|---|---|---|
| *H04B 1/38* | (2015.01) | |
| *H04L 27/00* | (2006.01) | |
| *H04L 12/26* | (2006.01) | |
| *H04L 12/40* | (2006.01) | |

(52) U.S. Cl.
CPC .......... *H04L 43/0811* (2013.01); *H04L 43/50* (2013.01); *H04L 2012/40215* (2013.01); *H04L 2012/40241* (2013.01)

(58) Field of Classification Search
USPC ............... 375/219, 220, 222, 238, 239, 240, 375/240.26–240.27, 285, 284, 278, 295, 375/296, 316, 324, 340, 346, 353
See application file for complete search history.

(56) References Cited

U.S. PATENT DOCUMENTS

| | | | | |
|---|---|---|---|---|
| 7,812,617 | B2 | 10/2010 | Hofman | |
| 8,254,437 | B2 * | 8/2012 | Fujita | H04B 1/7174 327/1 |
| 9,103,869 | B2 * | 8/2015 | Breed | G01R 31/11 |
| 9,515,606 | B2 * | 12/2016 | Umeda | H03B 5/1228 |
| 2002/0067802 | A1 * | 6/2002 | Smith | H04B 3/46 379/1.04 |
| 2006/0106578 | A1 * | 5/2006 | Yamada | G06F 11/221 702/183 |
| 2010/0216395 | A1 * | 8/2010 | Sasaki | H04B 1/7174 455/39 |
| 2010/0327960 | A1 * | 12/2010 | Huber | H03K 19/0016 327/538 |
| 2011/0069738 | A1 * | 3/2011 | Sugino | G01S 13/0209 375/130 |
| 2012/0126761 | A1 * | 5/2012 | Tuten | H02M 3/156 323/271 |
| 2013/0187656 | A1 * | 7/2013 | Barrenscheen | H03K 17/28 324/415 |
| 2013/0195216 | A1 * | 8/2013 | Nakasha | H04L 25/03 375/295 |
| 2013/0271151 | A1 * | 10/2013 | Breed | G01R 31/11 324/533 |
| 2014/0189131 | A1 * | 7/2014 | Schmoetzer | H04L 47/70 709/226 |

* cited by examiner

*Primary Examiner* — Linda Wong

(74) *Attorney, Agent, or Firm* — Manelli Selter PLLC; Edward J. Stemberger

(57) ABSTRACT

Presented is a system for monitoring the integrity of a communication bus.

7 Claims, 5 Drawing Sheets

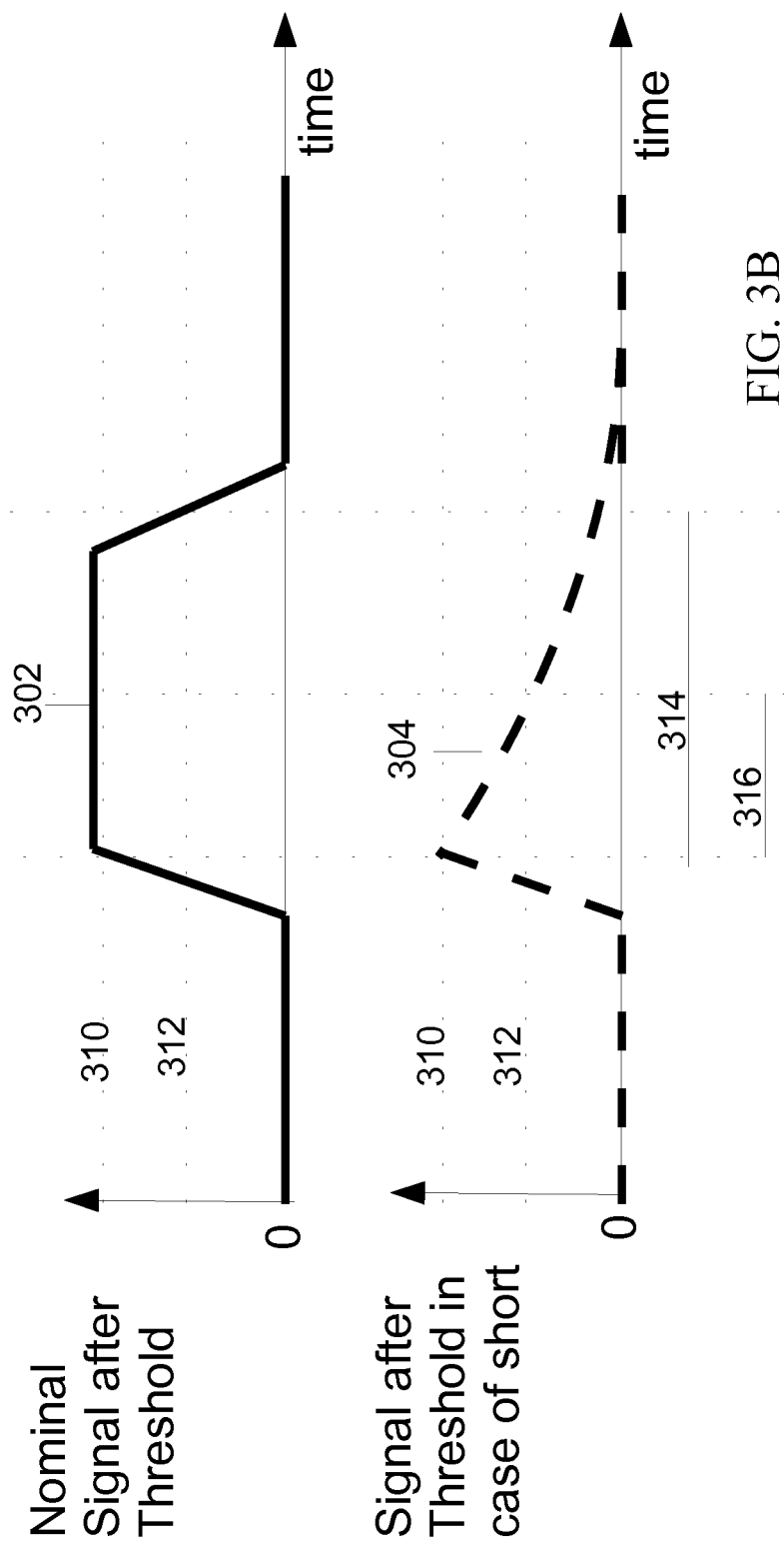

FAULT DETECTION IN COMMUNICATION SYSTEM

TECHNOLOGY FIELD

The present device and method relate to the field of communication bus status diagnostics and in particular to real time detection of faults in communication buses.

BACKGROUND

There are several architectures for transmitting information from one electronic device to another. A commonly used architecture is shown in FIG. 1. In this architecture the devices share a common communication structure, often called a data bus or communication bus. In this architecture, each device connected to the bus can transmit information on the bus, or receive any information transmitted on the bus. In addition the information transmitted on the bus can pass undistorted through each of the devices. The section of the communication bus connecting one device to another may be termed communication bus line or link. The physical medium through which the signal is transported can be an electrical wire or optical fiber. The signal transmitted from one device to another device on the communication bus can be a change in the voltage, an optical pulse, an electrical pulse with an underlying RF (radio frequency) modulation or similar implementations. Examples of such buses are Mil-Std-1553, CAN bus, FlexRay and others. Since the transmitted signal passes through multiple devices, it is clear that the connection to each device should not cause any changes in the signal. In a one dimensional communication bus, every device has at most two bus links connecting it to other devices. In a two dimensional or multi-dimensional communication bus there is at least one device with three or more bus links connecting it to other devices. In particular, the devices, and the communication bus links should be impedance matched to prevent reflections of the signal. Conversely, any situation in which there is a fault in the communication bus link, the fault and bus link would not be impedance matched and the result would be a reflected signal.

The communication buses described above can host a large amount of devices. A potential problem in these buses is that a fault in the bus would prevent the passage of information from devices before and after the fault. Current techniques to identify faults or failures in the bus are too costly to support use in low cost applications which some industries such as in-car communications require. U.S. Pat. No. 7,812,617 to the same assignee, describes a method to identify the fault in a communication bus. The method is based on identifying reflections in the communication bus. The reflections are caused by the fault in one of the bus links and are referred to as 'signal tail'. U.S. Pat. No. 7,812,617 suggest a method of identifying the location of the fault by measuring the timing of such multiple tails, and using triangulation to identify the location of a fault.

Glossary

Communication bus—as used in the current disclosure the term "communication bus" means a structure connecting between different devices or modules configured to receive and transmit signals from one or more sources of the signal to one or more devices or modules hosted by the bus.

Bus link or line—as used in the current disclosure the term "bus link or line" means a continuous electric or optical line extending through two or more devices or modules on the bus.

Data bus—as used in the current disclosure the term "data bus" means a structure connecting between different devices or modules configured to receive and transmit data from one or more sources of the signal to one or more devices or modules hosted by the bus.

Impedance matched—as used in the current disclosure the term "impedance matched" means the characteristic impedance of the bus link is matched to the characteristic impedance of the device connected to the link. Also it means that the impedance of the line is constant.

Fault in the bus—as used in the current disclosure the term "fault in the bus" means a portion of a bus line or device hosted on the bus, which is not impedance matched and causes a reflection in or of the transmitted signal.

Integrity of the bus—as used in the current disclosure the term "integrity of the bus" means that no faults are identified in the line.

Physical medium—as used in the current disclosure the term "physical medium" means the material, composition and form (e.g. copper wire, optical fiber, etc.) of the communication bus link.

Signal tail—as used in the current disclosure the term "signal tail" means the temporal function of the last part of the signal.

Signal width—as used in the current disclosure the term "signal width" means the elapsed time from a threshold level crossing of the rising part of the signal, to a threshold level crossing of the falling part of the signal.

Signal rise time—as used in the current disclosure the term "signal rise time" is the time required for the signal to raise to its ON state.

Signal fall time—as used in the current disclosure the term "signal fall time" is the time required for the signal to return to its OFF state.

Pulse start—as used in the current disclosure the term "pulse start" is the section of pulse after crossing the threshold of the rising signal.

Pulse end—as used in the current disclosure the term "pulse end" is the section of the pulse before crossing the threshold of the falling signal.

Differential bus link as used in the current disclosure "differential bus link" is a bus link composed of two electrically conductive wires where the signal is the voltage difference between the wires.

System ground as used in the current disclosure the term "system ground" is a common or global electrical element to which all other voltages in the system are referenced. Any wire electrically connected to the ground will have a voltage of zero.

Short in the bus as used in the current disclosure the term "short in the bus" is a connection of at least one of the differential bus wires to the system ground or an electrical connection between the wires of the differential bus.

BRIEF DESCRIPTION OF THE DRAWINGS

FIG. 3B is an example of the nominal pulse shape of the communication system after the threshold circuit, and the pulse shape in case of a short in the system after the threshold circuit.

DETAILED DESCRIPTION OF EXEMPLARY EMBODIMENTS

Figure 1:
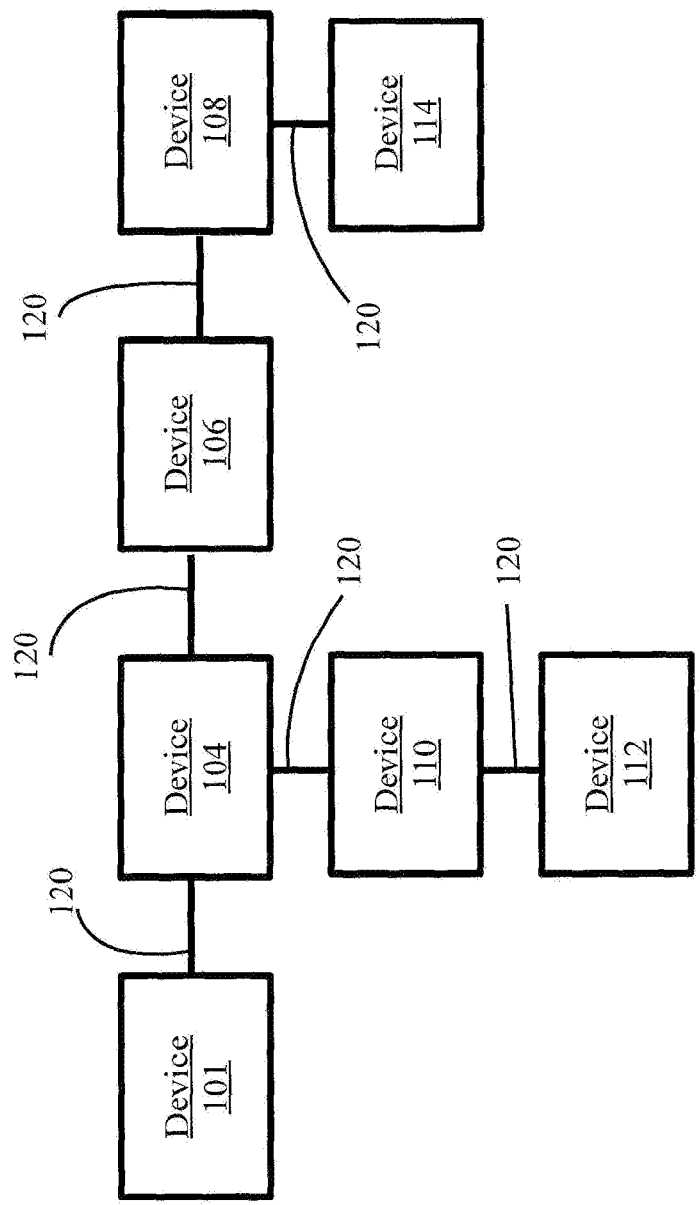
FIG. 1 is an example of existing communication bus architecture for connecting multiple devices.

A typical known communication bus is shown in FIG. 1. This bus includes a number of devices 101, 104, 106, 108, 110, 112, and 114, which are connected to the communication bus, 120. The communication between the devices is achieved by the communication bus, 120. In the course of normal communication bus 120 operation, signals are transmitted along the bus, and through each of the devices, without changes or distortion or with potentially small changes in the signal which meets the defined bounds of the communication bus 120.

Figure 2:
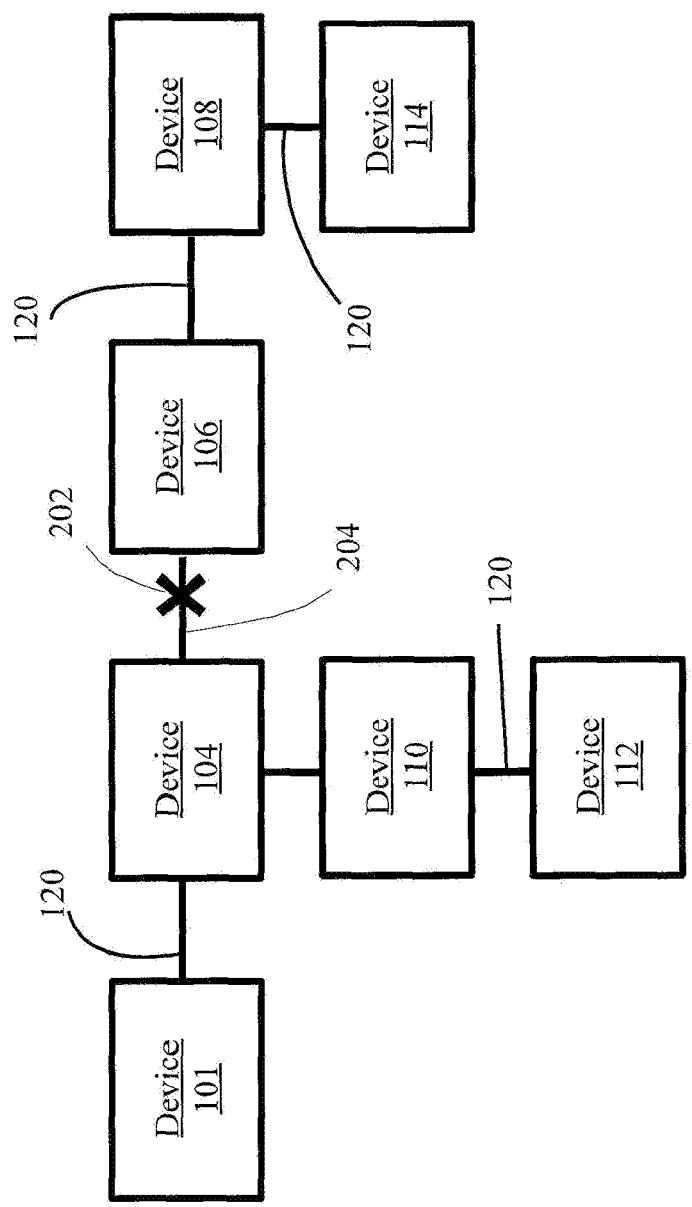
FIG. 2 is an example of a fault in a communication bus.

FIG. 2. Is an example of a short, 202, in a communication bus 120. The short, 202 violates the integrity of the communication bus link 240. In the case of a short, all the communication to devices 101, 104, 106, 108, 110, 112, and 114 connected to the bus 120 will be affected since the short prevents any voltage buildup or transmission in the bus.

The communication buses described above can host a large amount of devices. A potential problem in these buses is that a short in the communication bus would prevent the passage of information from devices before the short to devices after the short and from devices after the short to the devices before the short. U.S. Pat. No. 7,812,617 to the same assignee, describes a method to identify the communication link with a fault in a two dimensional network. The method is based on identifying reflections in the communication bus. The reflections are caused by the fault in the line and referred to as 'signal tail'. U.S. Pat. No. 7,812,617 suggest a method of identifying the location of the fault by measuring the timing of such multiple tails, and using triangulation to identify the location of a fault.

The above described method does not function in case of a short in the bus. In case of short in the bus it is expected that no voltage difference would be generated. In case of a short between a line and ground, the voltage of that line would be zero, and the voltage difference between both lines would be half the expected value. In case of a short between both lines, the expected voltage difference between the lines is zero and no signal is transferred across the line. Hence a fault in the form of a short renders the bus inoperable and also limits the ability to locate the fault by using reflected signals as described in U.S. Pat. No. 7,812,617.

Figure 3A:
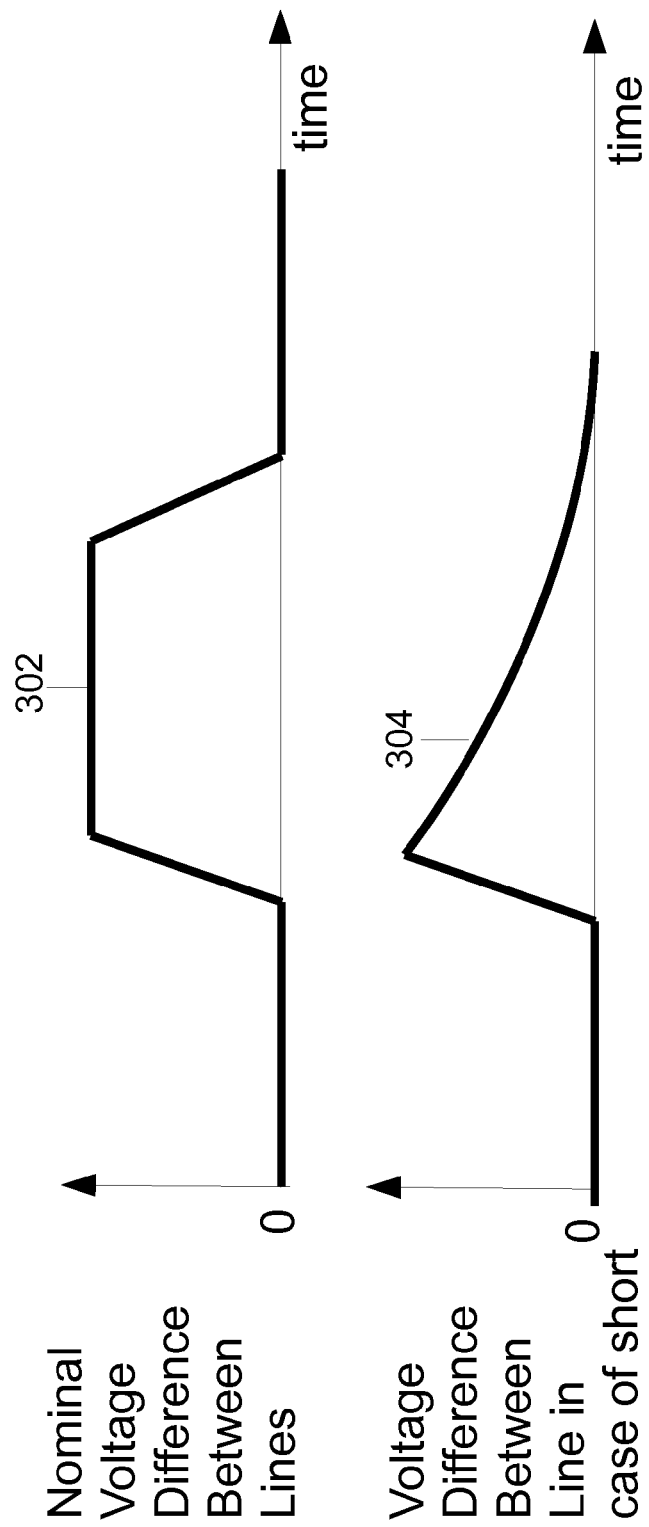
FIG. 3A is an example of the nominal pulse shape of the communication system and the pulse shape in case of a short in the system.

FIG. 3A, is an example of the voltage difference between the lines in case of a short in the differential bus as function of time. The voltage is measured at the transmitter. Reference number 302 marks the nominal transmitted voltage difference curve. Reference number 304 marks the curve which represents the actual voltage difference between the communication bus lines in case one of the lines is shorted to the ground or the lines are shorted one to another. As shown in FIG. 3A, in the case of a short, there is an initial voltage which decays exponentially over time to a zero voltage difference. The voltage difference is defined by the transmitter, which creates a voltage on each of the lines and a corresponding voltage difference between the lines. For example, the transmitter can create a voltage of 1 Volt on one line and −1 Volt on the second line and a corresponding voltage difference of 2V between the lines. Since the short is a connection of the line to a different voltage, for example a short of one line to the ground implies that the voltage in that point is zero. The communication bus is a differential bus, which is composed of two electrical wires. The transmitter is connected to both wires. When the transmitter is transmitting a signal, it applies a voltage to each of the two wires. The signal is the difference between the voltages on the wires. The voltages on the wires may be positive or negative. As an example, the voltage on one wire may be 1 Volt and on the second wire −1 Volt. The signal in this case is 2 Volts.

A short in one of the wires defines the wire voltage at the short location. For example if the short is from the wire to the ground, than the voltage at that location is 0 (zero) Volt. In this example, the transmitter is defining one voltage, for example 1 Volt, and the short is defining a second voltage, for example zero Volt. As result there is a voltage difference along the wire which causes a current flow. The current is given by the voltage difference divided by the line resistance. The line resistance is given by the unit line resistance multiplied by the length of the wire from the transmitter to the short. The shorter the wire the larger the current flow. The possible options for current flow in case of a short between one wire and ground are:

the transmitter provides a positive voltage, for example 1 Volt, on the shorted wire. The current flow is from the transmitter to the short.

the transmitter provides a negative voltage, for example −1 Volt, on the shorted wire. The current flow is from the short to the transmitter.

In another example, the short can be between one wire and the second wire. In this case the transmitter the current will flow from the high voltage port of the transmitter, through the first wire, to the short, to the second wire and back to the low voltage port of the transmitter. As an example, if the high voltage port is +1 Volt and low voltage port is −1 Volt, the current will flow from the +1 Volt, through the wire connected to this port, to the short and back through the second wire to the −1 Volt port. The current will be given by the voltage difference, which in this case is 2 Volt, divided by the resistivity of the link. To prevent damage to the transmitter, the transmitters are usually equipped with an overload current limiter which after a predefined current shuts off the current resulting in a drop of the voltage to zero. The shut off time depends on the current flow which is proportional to the line resistance. The line resistance is proportional to the distance from the transmitter to the short. Hence the pulse width is indicative of the distance of the short from the transmitter.

FIG. 3B is an example of a pulse width measurement system. The pulse width is measured by a voltage crossing system. The forward part of the pulse has a rising voltage level. As the voltage rises, it crosses the voltage level defined by line 310 and a timer is initiated. The timer is stopped when the trailing edge of the pulse in which the voltage is decreasing crosses the voltage level marked by 312. Voltage levels 310 and 312 can be different, but typically voltage level 312 would be lower than voltage level 310. The time measured by the timer is the pulse width of the voltage signal. Line 314, which starts at the crossing of voltage level 302 and voltage level 310 and ends at the crossing of voltage level 302 and voltage level 312, marks the pulse width of the nominal pulse 302. Line 316 which starts at the crossing of voltage level 304 and voltage level 310 and ends at the crossing of voltage level 304 and voltage level 312 marks the pulse width of a pulse in case of a short in the communication bus. As demonstrated in FIG. 3A, the transmitted pulse width in case of a short in the system falls off exponentially. Using the system described and shown in FIG. 3B the pulse in case of a short in the communication bus is shorter than the transmitted pulse width when there is no short.

Figure 4:
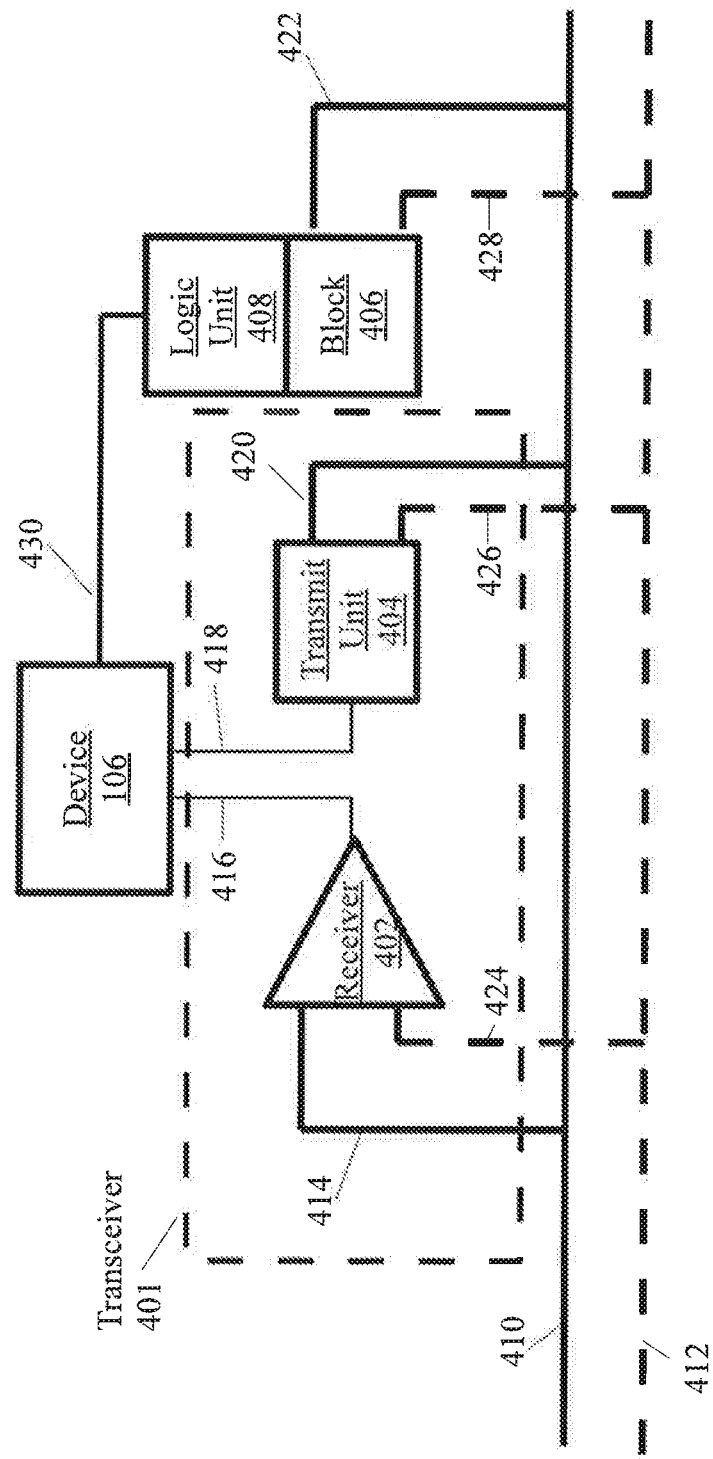
FIG. 4 is an example of a modified transceiver to detect shorts in the communication bus.

FIG. 4 is an example of a transceiver configured to measure the transmitted or received pulse width. Block 401 is a transceiver composed of a receive unit 402, a transmit unit 404. A block, 406 is configured to measure pulse width. Block 106 is a functional device connected to the transceiver. Since the pulse width is indicative of potential faults in the bus, the system shown in FIG. 4 can identify the occurrence of faults in the bus. Block 406 measures the voltage difference in the bus. Block 406 could be part of the receiver 402, or a standalone element. In one example, Block 406 is configured to detect a finite set of voltage differences. Block 406 provides an electrical signal to a logic unit 408. Logic unit 408 includes a timer configured to measure the duration between first level crossing and second level crossing. In one example, a voltage difference corresponding to the initial voltage difference in the line, e.g. 2V provides a signal to the logic unit 408, to start the timer. When block 406 detects a second voltage difference corresponding to smaller voltage than the initial voltage, e.g. 50% of the initial voltage, block 406 will signal the logic circuit 408 to stop the timer. The elapsed time is the pulse width. Hence the system configured to measure the pulse width of the transmitted or received pulse is configured to measure the voltage of the pulse and a timer is configured to start a time measurement when the pulse signal voltage exceeds at first voltage level and the timer is configured to stop the time measurement when the voltage of the pulse is below a second level.

In the absence of a fault in the line, the measured pulse width will be the nominal pulse width which is defined by the communication bus protocol. In case of a short, the pulse width would be shorter. The resulting system for monitoring of integrity of a communication bus with the system comprising: a communication bus, at least one transmitter configured to generate and transmit a pulse signal on the communication bus, at least one receiver configured to receive a signal generated by a transmitter and transmitted on communication bus, and a system configured to measure the pulse width of the transmitted or received pulse. A short in the communication bus will manifest itself in the measured pulse being shorter than the transmitted pulse. Hence a measured pulse shorter than the transmitted pulse indicates a short in communication bus. In another example the system for monitoring of integrity of a communication bus with the system comprising: a communication bus, at least one transmitter configured to generate and transmit a pulse signal on the communication bus, at least one receiver configured to receive a signal generated by a transmitter and transmitted on communication bus, at least one functional device connected to said transmitter and said receiver and a system configured to measure the pulse width of the transmitted or received pulse. A short in the communication bus will manifest itself in the measured pulse being shorter than the transmitted pulse. Hence a measured pulse shorter than the transmitted pulse indicates a short in communication bus.

As an example, when logic unit 408 identifies a pulse width which is shorter than the nominal pulse width, logic unit 408 can provide a signal to functional device 106 that there is a short in the communication bus. The functional device can be any of the devices connected to the communication bus. The indication of the short in the communication bus can be stored in the logic unit 408, or any memory device which is part of 408. In an example where logic unit 408 is connected to functional device 106, the indication of a short in the communication bus can stored in functional device 106, in a memory unit connected to device. In addition to storing the occurrence of the fault, logic unit 408, or functional device 106 or any associated memory element can record the measured pulse width. The pulse width of the fault provides an indication of the distance of the short from the transceiver. Since a short in the communication bus, prevents communication on the bus, all information is kept at the device level. However shorts may be intermittent, in which case the fault information can be transmitted on the bus to a central fault registering system, whenever there is no longer a short condition in the communication bus. In one example the memory unit is configured to maintain a record of faults in the system bus.

What is claimed is:

1. A system for monitoring of integrity of a communication bus said system comprising:
   a communication bus cooperating with;
   two or more transmitters, each of the two or more transmitters configured to generate and transmit a pulse signal on the communication bus;
   at least one receiver configured to receive a signal generated by a transmitter and transmitted on the communication bus; and
   a pulse signal width measuring unit, electrically connected to the two or more transmitters and to the at least one receiver, comprising: voltage comparison block; first and second reference voltages and a timer; wherein the timer is activated when a pulse signal voltage is above the first reference voltage and the timer is stopped when the pulse signal voltage is below the second reference voltage, said pulse width measuring unit being constructed and arranged to measure a pulse width of a pulse of the least one receiver and a pulse width of a pulse of the two or more transmitters; and
   wherein a measured pulse width, measured by the pulse signal width measuring unit, of a received pulse at any of said at least one receiver being shorter than the pulse width of a transmitted pulse from any of said transmitters indicates a short in the communication bus.

2. The system according to claim 1, wherein the communication bus is at least one of a group of buses consisting of CAN bus, Mil-Std-1553, and FlexRay.

3. The system according to claim 1, wherein the pulse signal width measuring unit is configured to measure the pulse width of the transmitted pulse from said transmitter or received pulse at said receiver comprises measuring a voltage level crossing and a timer configured to start at first level crossing and stop at second level crossing.

4. A system for communicating on a communication bus said system comprising:
   a communication bus cooperating with:
   two or more transmitters, each of the two or more transmitters configured to generate and transmit a pulse signal on communication bus;
   at least one receiver configured to receive a pulse signal generated by a transmitter and transmitted on the communication bus;
   at least one functional device connected to said transmitter and said receiver; and
   a pulse signal width measuring unit, electrically connected to the two or more transmitters, to the at least one receiver and to the at least one functional device, comprising:
   voltage comparison block;
   first and second reference voltages and a timer;

wherein the timer is activated when a pulse signal voltage is above the first reference voltage and the timer is stopped when the pulse signal voltage is below the second reference voltage, said pulse width measuring unit being constructed and arranged to measure a pulse width of a pulse of the least one receiver and a pulse width of a pulse of the two or more transmitters;

wherein a measured pulse width, measured by the pulse signal width measuring unit, of a received pulse in any of the at least one receiver being shorter than a pulse width of a transmitted pulse from any of the two or more transmitters indicates a short in the communication bus.

5. The system according to claim 4, wherein the communication bus is at least one of a group of buses consisting of CAN bus, Mil-Std-1553, and FlexRay.

6. The system according to claim 4, wherein the functional device includes a memory unit.

7. The system according to claim 6, where the memory unit is configured to maintain a record of faults in the system bus.

* * * * *